UNITED STATES PATENT OFFICE.

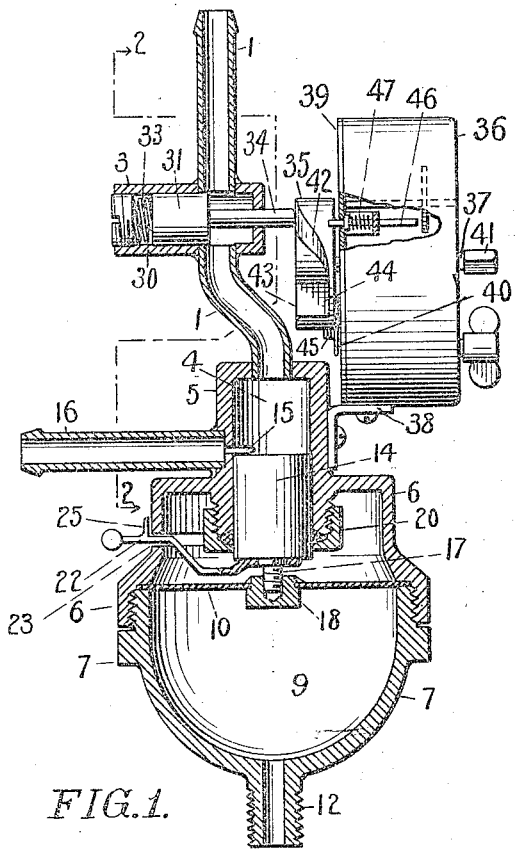

EDMUND GILBERT LODGE, OF PHILADELPHIA, PENNSYLVANIA.

GAS-REGULATOR.

1,300,982.　　　　　Specification of Letters Patent.　　Patented Apr. 15, 1919.

Application filed July 19, 1917.　Serial No. 181,476.

*To all whom it may concern:*

Be it known that I, EDMUND GILBERT LODGE, a citizen of the United States, residing at Philadelphia, in the county of Philadelphia and State of Pennsylvania, have invented certain new and useful Improvements in Gas-Regulators, of which the following is a specification.

My invention relates to improvements in regulators particularly adapted to be used in connection with dental vulcanizers and my invention comprises in its construction pressure regulating mechanism for controlling the flow of gas to the burner of the vulcanizer, and also timing mechanism for shutting off the flow of gas from the burner.

The object of my invention is to provide a valve having a piston therein controlled by the pressure in the vulcanizer and also means for adjusting the position of the said piston and thereby varying the operation of the piston in relation to the pressure in the vulcanizer; a further object of my invention is to provide a novel form of shut-off valve, having a piston therein actuated by the timing mechanism; a still further object of my invention is to so construct the said valves that they will operate freely and at the same time will be leak proof; a still further object of my invention is to provide a cam upon the timing mechanism which will actuate the piston of the shut-off valve and close the latter and also stop the timing mechanism; and a still further object is to so arrange the said cam that upon its being rotated by hand it will release the time stop and also move the piston of the shut-off valve into the position to again open said valve.

Referring to the accompanying drawing: Figure 1, is a vertical section of the gas regulator; Fig. 2, is a vertical section on line 2—2 Fig. 1; and Fig. 3, is a perspective view of the cam for controlling the shut-off valve, detached.

In the drawing in which like reference characters refer to like parts, 1 represents the gas inlet pipe and 3 the shut-off valve in the said inlet pipe. The inlet pipe 1, enters the chamber 4 formed in the regulating valve cylinder 5 located upon the upper portion of the casing 6. The lower portion 7 of the casing forms the pressure chamber 9. Between the upper and lower portions 6 and 7 of the casing is clamped a flexible diaphragm 10. The casing 7 is provided with a screw threaded stem 12 for securing the regulator to a vulcanizer, (not shown on the drawing), and the steam pressure is admitted from the vulcanizer through the stem 12 into the pressure chamber 9 of the regulator.

A valve piston 14 is slidably mounted in the gas chamber 4, in the cylinder 5, and the upper end of said piston 14 is adapted to open and close the port 15 formed in the cylinder 5. The port 15 communicates with the gas outlet pipe 16, through which gas is supplied to the burner of the vulcanizer, (not shown on the drawing). The piston 14 is provided with a threaded rod 17, which enters a threaded nut 18 secured in the center of the diaphragm 10. The piston 14 is thus carried by the diaphragm 10, and the pressure upon the latter will operate the piston sufficiently to open and close the port 15. Said piston 14 is surrounded by a packing ring 20 to prevent the escape of gas.

A handle 22 is secured to the piston 14 and the free end thereof projects through the elongated opening 23 formed in the casing 6. By turning the handle 22 the threaded rod 17 may be screwed into or out of the nut 18 and the position of the piston 14 may thus be varied in relation to the gas port 15 in the cylinder 5. The handle 22 is made of flat spring metal so as not to interfere with the vertical movement of the piston.

A pointer 25 is provided upon the handle 22 and upon the outer surface of the casing 6 is formed a graduated scale, indicating degrees of heat, at which temperature the steam pressure will act upon the diaphragm and close off the port 15. By changing the position of the handle 22 the gas port 15 will be opened and closed by more or less steam pressure as desired.

The gas shut-off valve 3 consists of the cylinder 30, in which is slidably mounted a piston 31 adapted to close the apertures formed in the cylinder 30, which communicate with the pipe 1. A spring 33 acts upon the piston 31 and tends to move the piston into a position to close the said apertures formed in the cylinder 30.

A rod 34 is carried by the piston 31 and said rod extends through an opening formed in the end of the valve cylinder 30. The outer end of the rod 34 rests upon the face of the cam 35, carried by the timing mechanism 36, consisting of the ordinary clock mechanism, having the hands removed and the said cam 35 secured upon the shaft 37, which usually carries the hour hand.

The clock 36 is secured upon the casing by a bracket 38. The face 39 of the clock is graduated to indicate hours and minutes and a pointer 40 carried by the cam 35 facilitates in setting the clock to run a certain time. The cam 35 may be rotated, in the direction of the arrow Fig. 2, by the handle 41 on the shaft 37, which will cause the inclined portion 42 of the cam 35 to push the rod 34 against the action of the spring 33 and open the valve 3.

By setting the pointer 40 at the sixty minute mark on the dial the clock will run for one hour or until the pointer reaches the vertical position, at which position the rod will drop off the high part 43 of the cam 35 onto the low part 44 of the cam, which will permit the spring 33 to act upon the piston 31 and close the shut-off valve 3. The cam 35 will continue to revolve until the inclined plate 45 upon the pointer 40 strikes the stop-rod 46, which latter is moved inwardly against the spring 47 and engages one of the wheels of the clock, thus stopping the clock, while the valve rod 34 is still on the low part 44 of the cam, with the valve 3 closed. The stop-rod 46 is released and the clock started when the cam 35 is again turned by the handle 41.

Having thus described my invention I claim and desire to secure by Letters Patent;

1. In a device of the character described, a casing, a diaphragm in the casing forming a pressure chamber, a cylinder forming a gas chamber, said cylinder concentrically mounted upon the casing in relation to the diaphragm, a valve piston slidably mounted in said cylinder adapted to control the flow of gas through the cylinder, and means for adjustably connecting the piston with the diaphragm so that the position of the piston may be changed in relation to the said diaphragm.

2. In a device of the character described, a casing, a diaphragm in the casing forming a pressure chamber, a cylinder forming a gas chamber, said cylinder concentrically mounted upon the casing in relation to the diaphragm, a valve piston slidably mounted in said cylinder adapted to control the flow of gas through the cylinder, a rod having a screw thread thereon secured to the piston, a nut secured to the diaphragm, said nut having a screw threaded aperture formed therein to receive said rod, and means for turning the piston to adjust the same in relation to the diaphragm.

3. In a device of the character described, a casing, a diaphragm in the casing forming a pressure chamber, a cylinder upon said casing forming a gas chamber, a valve piston slidably mounted in said cylinder adapted to control the flow of gas through the cylinder, a screw threaded member connecting the piston with the diaphragm, and a handle for rotating the screw threaded member to adjust the piston in relation to the diaphragm.

4. In a device of the character described, a casing consisting of two sections, a diaphragm secured between the sections of the casing and forming a pressure chamber in one portion of the casing, a cylinder upon one section of the casing forming a gas chamber, a valve piston slidably mounted in the cylinder, a threaded member to adjustably connect the piston with the diaphragm, and a handle upon the piston for rotating the latter to adjust the piston in relation to the diaphragm.

5. In a device of the character described, a casing consisting of two sections, a diaphragm secured between the sections of the casing and forming a pressure chamber in one portion of the casing, a cylinder upon one section of the casing forming a gas chamber in the opposite portion of the casing, a valve piston slidably mounted in the said cylinder, a screw threaded member to adjustably connect the piston with the diaphragm, a handle upon the piston for rotating the same, and said casing having an elongated slot formed therein through which the handle projects to permit the free end of the handle to be rotated and thereby adjust the piston in relation to the diaphragm.

6. In a device of the character described, a casing consisting of two sections, a diaphragm secured between the said sections forming a pressure chamber in one portion of the casing, a cylinder upon one section of the casing forming a gas chamber in the opposite portion of the casing, a valve piston adjustably connected with the diaphragm, said piston slidably mounted in the gas chamber, a handle for rotating the piston to adjust the latter in relation to the diaphragm, said casing having an elongated slot formed therein through which the handle projects to permit the free end of the handle to be rotated and thereby adjust the piston in relation to the diaphragm, a graduated scale upon the outside surface of the casing located adjacent to the said slot, and a pointer upon the handle located adjacent to the said scale.

In testimony whereof I affix my signature in presence of two witnesses.

EDMUND GILBERT LODGE.

Witnesses:
  MEYER KRAUS,
  JOHN A. O'BRIEN.